(No Model.) 2 Sheets—Sheet 1.

O. P. CRANMER.
CORN PLANTER.

No. 483,376. Patented Sept. 27, 1892.

Witnesses
John Imbrie
Bernard Werle

Inventor
Otis P. Cranmer
By his Attorney
Charles E. Adamson (No Model.) 2 Sheets—Sheet 2.

O. P. CRANMER.
CORN PLANTER.

No. 483,376. Patented Sept. 27, 1892.

Witnesses
John Irivine
Bernard Werle

Inventor
Otis P. Cranmer
By his Attorney
Charles E. Adamson

UNITED STATES PATENT OFFICE.

OTIS P. CRANMER, OF SUMMITVILLE, INDIANA.

CORN-PLANTER.

SPECIFICATION forming part of Letters Patent No. 483,376, dated September 27, 1892.

Application filed December 19, 1891. Serial No. 415,577. (No model.)

*To all whom it may concern:*

Be it known that I, OTIS PERRY CRANMER, a citizen of the United States, residing at Summitville, in the county of Madison and State of Indiana, have invented certain new and useful Improvements in Corn-Planters; and I do hereby declare the following to be a full, clear, and exact description of the invention, such as will enable others skilled in the art to which it appertains to make and use the same.

My invention relates to certain improvements in corn-planters, and relates to that class of planters in which two or more rows are planted simultaneously.

My said invention consists in certain novelty in the construction, arrangement, and combination of the various parts of the same, all of which I will now proceed to point out and describe, reference being had to the accompanying drawings, in which—

Figure 1:
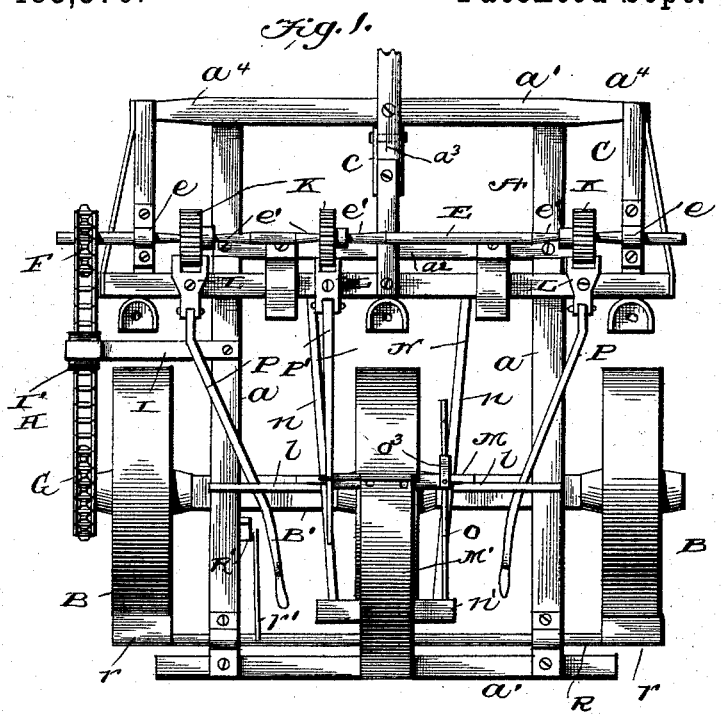
Figure 2:
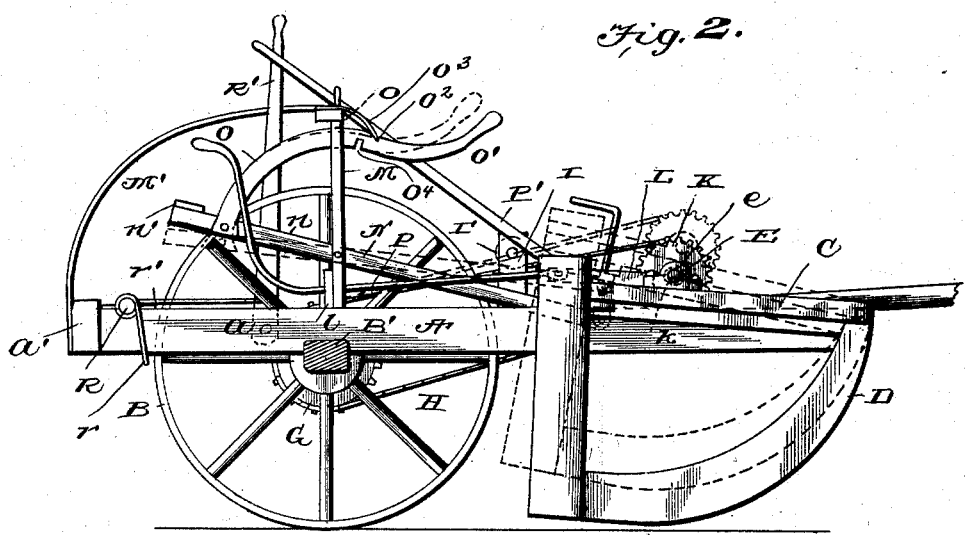
Figure 3:
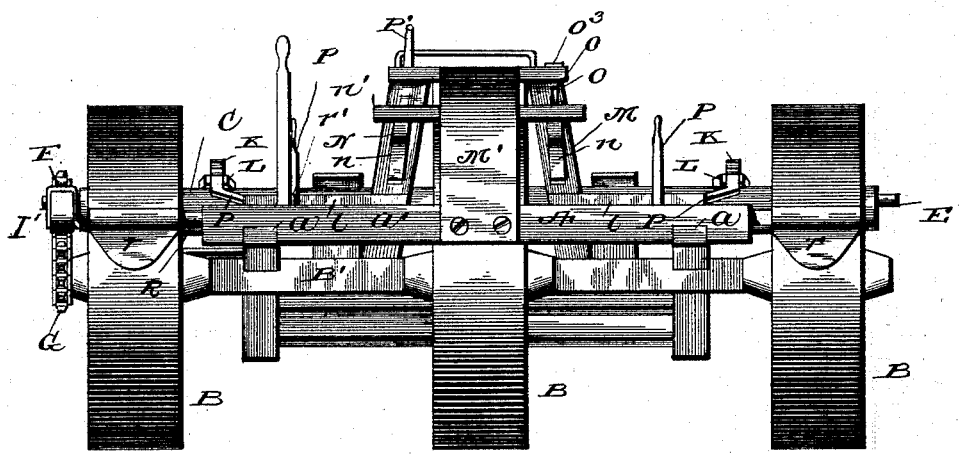
Figure 7:
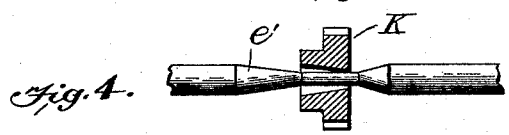
Figure 4:
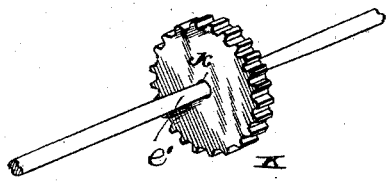
Figure 5:
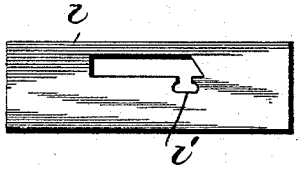
Figure 6:
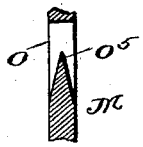

Figure 1 is a top plan view of my said invention. Fig. 2 is a partial side elevation. Fig. 3 is a partial rear elevation. Figs. 4, 5, and 6 are details of various parts of said invention. Fig. 7 is a sectional detail illustrating the clutch mechanism.

Referring to said drawings, A represents the main frame, composed of the side bars $a$, front and rear bars $a'$, cross-bar $a^2$, and bar $a^3$, connecting the bars $a'$ and $a^2$. To the bar $a^3$ a tongue may be attached, or said bar may be extended to form the tongue. Said frame is supported upon suitable carrying and covering wheels B, mounted upon an axle B', secured to the frame A. In the drawings the machine is shown with three wheels, as it is designed to plant three rows of corn. The outer ends of the front bar $a'$ are extended beyond the sides of the frame, as at $a^4$, and to said ends is pivoted or hinged a frame C, having also a pivoted connection $c$ with the bar $a^3$.

D are the furrow-openers, secured to the frame and located immediately in front of the wheels B. Said furrow-openers are of any designed construction. On the frame C the seed-boxes, dropping mechanism, and conducting-tubes are to be mounted. Any preferred form of dropping mechanism and drills may be employed.

E is a shaft mounted in bearings $e$, formed on the frame C. On one end of said shaft is rigidly mounted a sprocket-wheel F.

G is a sprocket-wheel secured to the hub of one of the outer wheels B.

H is a sprocket-chain connecting the sprocket-wheels F and G, and thus imparts motion to the shaft E.

I is a spring-arm secured to and projecting from one side of the frame H and carrying in its outer end a pulley I', which engages the sprocket-chain and regulates the tension.

A weighted arm may be substituted for the spring-arm I, if desired.

K are gears mounted on shaft E and arranged to have a friction-clutch connection with said shaft E, said clutch being formed by tapering the shaft at the points where the gears are mounted thereon, as at $e'$, and forming a tapering box or opening $k$ through the gears K.

L are levers pivoted or fulcrumed on the frame C, and having forked ends engaging the gear K, whereby said gear may be thrown in or out of gear with the shaft E. These gears are connected with the dropping mechanism by any suitable gearing or mechanism, which in the present instance is not shown. It will thus be seen that any one of the dropping devices may be thrown in or out of gear independently of the others by means of the mechanism just described. This feature of my invention is of great advantage, especially, for instance, when planting a triangular piece of field.

M is an upright frame secured to the axle.

M' is a curved standard secured at its lower end to the rear of the frame A and at its upper forward end to the upright frame M.

A driver's seat may be secured on the standard M' or may be secured upon a separate standard attached to frame A.

N is a lever fulcrumed on the frame M and consisting of two members $n$, connected at their rear ends by a cross-piece $n'$. The forward end of said lever is pivoted to the hinged frame C.

O is a lever-arm pivoted at one end of the rear of the lever N and passing through a slot or guide $o$ in the upright frame M and having a curved outer end $o'$.

$o^2$ is a notch on the upper side of the arm, which is adapted to be engaged by a catch $o^3$ and hold the furrow-openers down and in an operative position. To raise the furrow-openers, the catch $o^3$ is released from the notch $o^2$, the rear end of the lever N is depressed, and the lever-arm drawn back to the position shown in dotted lines, Fig. 2, raising the rear of the frame C until a notch $o^4$, Fig. 6, in the under side of the lever-arm, engages a stop $o^5$, formed at the bottom of the slot or guide $o$, and holds said frame C and the furrow-openers carried thereby in an operative position.

P are rods connected to the rear ends of the levers L, which engage the outer gears connected with the dropping mechanism. By means of these rods the gears are operated. Said rods are mounted in guides $l$, Fig. 5, formed on the frame A, and are provided with catches $l'$ for holding the same as adjusted.

P' is a lever connected with the rear of the center lever L, by means of which said lever L is operated.

R is a rocking shaft mounted on the rear of the frame A and carrying in its ends scrapers or brakes $r$. R' is its operating-lever connected with said shaft R by a link $r'$.

From the construction described it will readily be seen that the frame carrying the furrow-openers and dropping mechanism can be readily and easily lowered or raised, so as to place the said parts of the machine in an operative or inoperative position, and, further, that any one of the devices for dropping the seed may be thrown in or out of gear independently of the others.

Having thus fully described my invention, what I claim as new, and desire to secure by Letters Patent, is—

1. In a corn-planter such as described, a driving-shaft, mechanism connecting said shaft with the carrying and driving wheels, gears for operating the dropping mechanism, mounted upon the driving-shaft and having friction-clutch connections with said shaft, and mechanism for throwing any one of said gears in or out of connection with the shaft independent of the other gears, substantially as shown and described.

2. In a corn-planter such as described, the combination of a main frame, the driving-shaft E, mounted in suitable bearings, mechanism for operating the shaft, the gears K for operating the dropping mechanism, mounted on said shaft E and having friction-clutch connections therewith, and the levers L, engaging the gears K, all constructed, arranged, and operating substantially as shown and described, whereby any one of said operating-gears may be thrown in or out of connection with the driving-shaft.

In testimony whereof I affix my signature in presence of two witnesses.

OTIS P. CRANMER.

Witnesses:
JAMES M. HUNDLEY,
ELI POINDEXTER.